United States Patent
Luo et al.

(10) Patent No.: US 12,152,687 B2
(45) Date of Patent: Nov. 26, 2024

(54) MICRO-FLOW VALVE CONTROL MECHANISM

(71) Applicant: SUZHOU RAYONTECH TECHNOLOGY CO., LTD, Jiangsu (CN)

(72) Inventors: Yong Luo, Jiangsu (CN); Renqin Zhang, Jiangsu (CN); Hongmei Chen, Jiangsu (CN); Cheng-Te Lin, Jiangsu (CN); Chen Ye, Jiangsu (CN); Xiaoming Zhu, Jiangsu (CN)

( * ) Notice: Subject to any disclaimer, the term of this patent is extended or adjusted under 35 U.S.C. 154(b) by 0 days.

(21) Appl. No.: 17/908,869

(22) PCT Filed: Oct. 28, 2020

(86) PCT No.: PCT/CN2020/124523
§ 371 (c)(1),
(2) Date: Sep. 1, 2022

(87) PCT Pub. No.: WO2021/248780
PCT Pub. Date: Dec. 16, 2021

(65) Prior Publication Data
US 2024/0295275 A1    Sep. 5, 2024

(30) Foreign Application Priority Data
Jun. 12, 2020   (CN) .......................... 202010534223.1

(51) Int. Cl.
*F16K 99/00*    (2006.01)
*F16K 1/32*    (2006.01)
(Continued)

(52) U.S. Cl.
CPC ............ *F16K 31/0606* (2013.01); *F16K 1/36* (2013.01); *F16K 31/0624* (2013.01);
(Continued)

(58) Field of Classification Search
CPC . F16K 1/32; F16K 1/36; F16K 27/029; F16K 31/0606; F16K 31/0624; F16K 31/0675; F16K 99/0001
(Continued)

(56) References Cited

U.S. PATENT DOCUMENTS 5,518,029 A * 5/1996 Schumacher ....... F16K 27/0245
                                                                251/129.21
6,273,396 B1 * 8/2001 Kato ................... F16K 31/0655
                                                                267/180
(Continued)

FOREIGN PATENT DOCUMENTS

CN        1869483 A      11/2006
CN        106763991 A    5/2017
(Continued)

OTHER PUBLICATIONS

Translation of EP 1582793 (A1), Joerg, Oct. 5, 2005.*
International search report of PCT/CN2020/124523.

*Primary Examiner* — William M McCalister

(57) ABSTRACT

The present disclosure discloses a micro-flow valve control mechanism, which comprises an electromagnetic coil, a base, a ring seat, a moving plate and an elastic plate; wherein the elastic plate is positioned above the base, the ring seat and the moving plate are positioned between the base and the elastic plate, the moving plate is positioned at the inner side of the ring seat. In this scheme, the structure of valve air intake control is optimized, and the ring seat plays the guiding role in the lifting of the moving plate to a certain extent, which ensures that the moving plate will not deflect in the air intake process, so that the outer ring at the lower side of the moving plate can allow air to enter uniformly, thus ensuring the working stability of the electromagnetic valve.

3 Claims, 1 Drawing Sheet

(51) Int. Cl.
  *F16K 1/36* (2006.01)
  *F16K 31/06* (2006.01)
  *F16K 27/02* (2006.01)

(52) U.S. Cl.
  CPC ............ *F16K 99/0001* (2013.01); *F16K 1/32* (2013.01); *F16K 27/029* (2013.01); *F16K 31/0675* (2013.01)

(58) Field of Classification Search
  USPC .................................................. 251/129.15
  See application file for complete search history.

(56) References Cited

U.S. PATENT DOCUMENTS

| | | | | |
|---|---|---|---|---|
| 8,944,101 | B2* | 2/2015 | Pifer ................. | F02M 25/0836 137/630.22 |
| 2013/0221255 | A1* | 8/2013 | Ferguson ............ | F16K 31/0651 251/321 |
| 2013/0306894 | A1* | 11/2013 | Wei ..................... | F16K 31/0658 251/359 |
| 2014/0091243 | A1* | 4/2014 | Leidig ..................... | F16K 25/04 251/186 |
| 2014/0326912 | A1* | 11/2014 | Da Pont .............. | F16K 31/0675 251/129.15 |
| 2015/0233487 | A1* | 8/2015 | Matsumoto ......... | F16K 31/0655 251/129.15 |
| 2016/0025228 | A1* | 1/2016 | Young .................. | F16K 37/0041 137/553 |
| 2016/0153576 | A1* | 6/2016 | Mortensen .............. | F16F 1/047 251/129.15 |

FOREIGN PATENT DOCUMENTS

| | | |
|---|---|---|
| CN | 111623163 A | 9/2020 |
| CN | 212564646 U | 2/2021 |
| EP | 0926412 A2 | 6/1999 |
| EP | 1582793 A1 | 10/2005 |
| JP | 2006242232 A | 9/2006 |

* cited by examiner

MICRO-FLOW VALVE CONTROL MECHANISM

TECHNICAL FIELD

The present disclosure relates to a flow or micro-flow valve control mechanism.

BACKGROUND

An electromagnetic valve is the main component of fluid flow control. The electromagnetic valve generally attracts a magnetic core through an electromagnetic coil, and controls flow through the opening degree of the magnetic core, which means the flow would be proportionally controlled through electromagnetic valve. The existing electromagnetic valve structure is not reasonable enough, so that the intake structure is not stable enough, which affects the accuracy of flow control.

SUMMARY

The present disclosure aims to provide a micro-flow valve control mechanism for overcoming the deficiency of the prior art.

In order to achieve the above purpose, the technical scheme adopted by the present disclosure is as follows: a micro-flow valve control mechanism, comprising an electromagnetic coil, a base, a ring seat, a moving plate and an elastic plate, wherein the elastic plate is positioned above the base, the ring seat and the moving plate are positioned between the base and the elastic plate, the moving plate is positioned at the inner side of the ring seat, and the base is provided with a sealing ring matched with the moving plate; the electromagnetic coil is positioned at the upper side of the elastic plate, the electromagnetic coil generates upward attraction force to the moving plate, and the elastic plate generates downward elastic force to the moving plate.

Preferably, the outer circumference of the upper side of the base is provided with a plurality of arc-shaped retaining walls, the upper surfaces of the plurality of arc-shaped retaining walls are flush, the ring seat is located on the arc-shaped retaining walls, and an air intake opening structure is formed between adjacent arc-shaped retaining walls.

Preferably, the outer circumference of the moving plate is in clearance fit with the inner wall of the ring seat.

Preferably, when the electromagnetic coil generates upward attraction force to the moving plate, the distance between the moving plate and the sealing ring is valve opening degree D, where D=D1+D2; D1 is the maximum lifting displacement distance of the moving plate before the moving plate is in contact with the elastic plate; and D2 is the deformation of the elastic plate generated in the vertical direction after the moving plate is in contact with the elastic plate.

Preferably, the height of the ring seat is H1, the thickness of the moving plate is H2, and the height of the sealing ring is H3, where H1=H2+H3+D1.

Due to the application of the technical scheme, compared with the prior art, the present disclosure has the following advantages.

In this scheme, the structure of valve air intake control is optimized, a ring seat is provided outside the moving plate, and the ring seat plays the guiding role in the lifting of the moving plate to a certain extent, which ensures that the moving plate will not deflect in the air intake process, so that the outer ring at the lower side of the moving plate can allow air to enter uniformly, thus ensuring the working stability of the electromagnetic valve. The electromagnetic coil generates upward attraction force to the moving plate, and the elastic plate generates downward elastic force to the moving plate, so that the height of the moving plate can be finely adjusted through the change in current of the coil, and then the opening degree of the valve can be changed. The base seat is provided with a sealing ring matched with the moving plate to ensure the tightness of the valve after the coil is powered off.

BRIEF DESCRIPTION OF THE DRAWINGS

The technical scheme of the present disclosure will be further explained with reference to the drawings hereinafter.

DETAILED DESCRIPTION OF THE EMBODIMENTS

The present disclosure will be further explained in detail with reference to the drawings and specific embodiments hereinafter.

Figure 1:
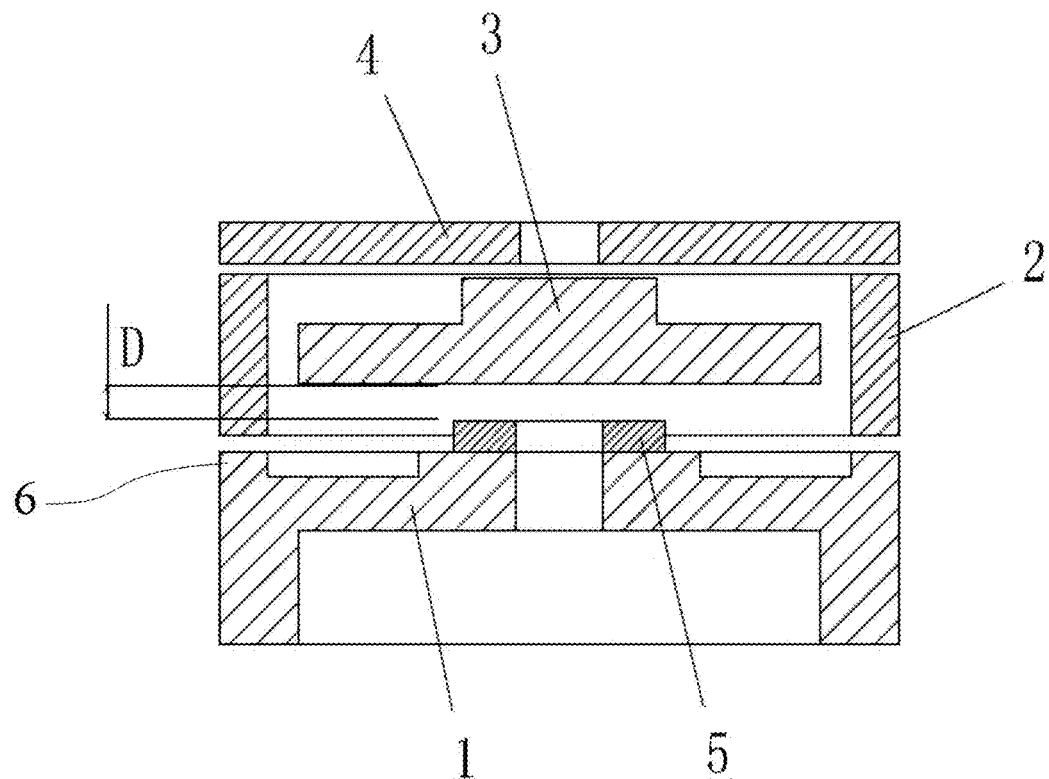
FIG. 1 is a schematic diagram of a micro-flow valve control mechanism according to the present disclosure.
Figure 2:
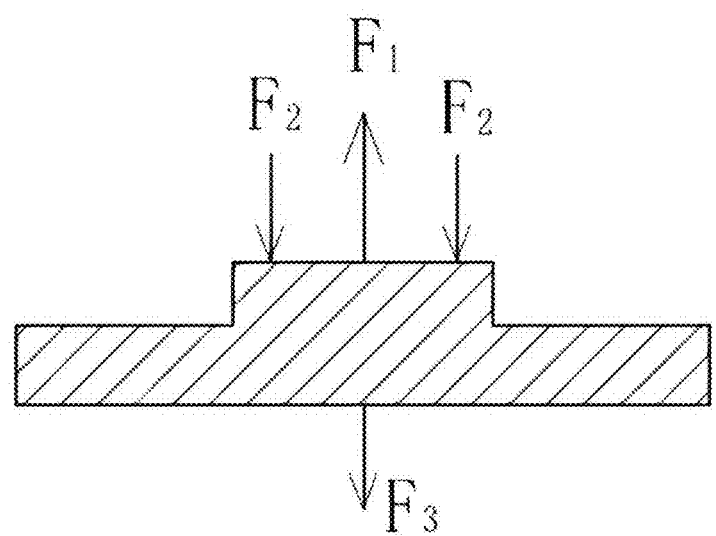
FIG. 2 is a schematic diagram of a stress structure of a moving plate according to the present disclosure.

As shown in FIG. 1 to FIG. 2, the micro-flow valve control mechanism of the present disclosure comprises an electromagnetic coil, a base 1, a ring seat 2, a moving plate 3 and an elastic plate 4, wherein the elastic plate 4 is positioned above the base 1, the ring seat 2 and the moving plate 3 are positioned between the base 1 and the elastic plate 4, and both the moving plate 3 and the elastic plate 4 are circular sheet structures; the moving plate 3 is positioned at the inner side of the ring seat 2, and the outer circumference of the moving plate 3 is in clearance fit with the inner wall of the ring seat 2, so that the ring seat 2 plays the guiding role in the lifting of the moving plate 3 to a certain extent; the base 1 is provided with a sealing ring 5 matched with the moving plate 3, and runner holes on the base 1 are located in the inner ring of the sealing ring 5. When the electromagnetic coil is not powered on, the moving plate 3 is located on the sealing ring 5 to seal the runner holes on the base 1. The sealing ring 5 can be made of Teflon, nitrile rubber buna, silica gel and other materials.

The outer circumference of the upper side of the base 1 is provided with a plurality of arc-shaped retaining walls, the upper surfaces of the plurality of arc-shaped retaining walls are flush, the ring seat 2 is located on the arc-shaped retaining walls, and an air intake opening structure is formed between adjacent arc-shaped retaining walls. Of course, it is not necessary to design an arc-shaped retaining wall structure on the base 1, and the air intake opening structure can be transferred to the lower end of the ring seat 2, but the air intake opening structure must be lower than the lower surface of the moving plate 3.

The electromagnetic coil is located at the upper side of the elastic plate 4. After the electromagnetic coil is powered on, upward magnetic attraction force $F_1$ is generated to the moving plate 3. After moving upward, the moving plate 3 will press the elastic plate 4, so that the elastic plate 4 generates downward elastic force $F_2$ to the moving plate 3. When passing between the moving plate 3 and the base 1, fluid will generate downward acting force $F_3$ to the moving plate 3 due to Bernoulli effect, where $F_1=F_2+F_3$. The current in the electromagnetic coil changes so as to change the magnetic attraction force $F_1$, and $F_1$ overcomes $F_2$ and $F_3$ to control the opening degree of the moving plate 3. Different opening degrees will produce different flow, and achieve the effect of precise control of micro flow. Thus, the micro flow will be proportionally controlled through electromagnetic valve.

When the electromagnetic coil generates upward magnetic attraction force to the moving plate 3, the distance between the moving plate 3 and the sealing ring 5 is valve opening degree D, where D=D1+D2; D1 is the maximum lifting displacement distance of the moving plate 3 before the moving plate 3 is in contact with the elastic plate 4; and D2 is the deformation of the elastic plate 4 generated in the vertical direction after the moving plate 3 is in contact with the elastic plate 4. Generally, D1 and D2 are not larger than 15 microns.

The height of the ring seat 2 is H1, the thickness of the moving plate 3 is H2, and the height of the sealing ring 5 is H3, where H1=H2+H3+D1. The ring seat 2 can be designed according to this formula during processing. However, as a part of the sealing ring 5 is generally buried in the base 1, the height H3 of the sealing ring 5 mentioned in the formula refers to the height of the sealing ring 5 higher than the mating surface of the ring seat 2 and the base 1.

In the figure, for the convenience of illustration, the components are slightly separated, but in fact, the lower side of the ring seat 2 should be tightly attached to the base 1, and the elastic plate 4 should be pressed by the electromagnetic coil at the upper side of the ring seat 2.

The above embodiments are only to illustrate the technical concept and characteristics of the present disclosure, aiming at enabling those skilled in the art to understand and implement the content of the present disclosure, rather than limit the scope of protection of the present disclosure. All equivalent changes or modifications made according to the spirit of the present disclosure should be included in the scope of protection of the present disclosure.

What is claimed is:

1. A micro-flow valve control mechanism, comprising an electromagnetic coil, a base (1), a ring seat (2), a moving plate (3) and an elastic plate (4), wherein the elastic plate (4) is positioned above the base (1), the ring seat (2) and the moving plate (3) are positioned between the base (1) and the elastic plate (4), the moving plate (3) is positioned at the inner side of the ring seat (2), and the base (1) is provided with a sealing ring (5) matched with the moving plate (3); the electromagnetic coil is positioned at the upper side of the elastic plate (4), the electromagnetic coil generates upward attraction force to the moving plate (3), and the elastic plate (4) generates downward elastic force to the moving plate (3);

wherein when the electromagnetic coil generates upward attraction force to the moving plate (3), the distance between the moving plate (3) and the sealing ring (5) is valve opening degree D, where D=D1+D2, D1 is the maximum lifting displacement distance of the moving plate (3) before the moving plate (3) is in contact with the elastic plate (4); and D2 is the deformation of the elastic plate (4) generated in the vertical direction after the moving plate (3) is in contact with the elastic plate (4), wherein the height of the ring seat (2) is H1, the thickness of the moving plate (3) is H2, and the height of the sealing ring(S) is H3, where H1=H2+H3+D1.

2. The micro-flow valve control mechanism according to claim 1, wherein the outer circumference of the upper side of the base (1) is provided with a plurality of arc-shaped retaining walls (6), the upper surfaces of the plurality of arc-shaped retaining walls (6) are flush, the ring seat (2) is located on the arc-shaped retaining walls (6), and an air intake opening structure is formed between adjacent arc-shaped retaining walls (6).

3. The micro-flow valve control mechanism according to claim 1, wherein the outer circumference of the moving plate (3) is in clearance fit with the inner wall of the ring seat (2).

* * * * *